United States Patent
Cai et al.

(10) Patent No.: US 12,405,736 B2
(45) Date of Patent: Sep. 2, 2025

(54) OPERATING METHODS, MEMORY CONTROLLERS, AND MEMORY SYSTEMS

(71) Applicant: Yangtze Memory Technologies Co., Ltd., Hubei (CN)

(72) Inventors: Jin Cai, Hubei (CN); Xianwu Luo, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 218 days.

(21) Appl. No.: 18/148,784

(22) Filed: Dec. 30, 2022

(65) Prior Publication Data
US 2024/0176519 A1  May 30, 2024

(30) Foreign Application Priority Data
Nov. 24, 2022  (CN) .......................... 202211485510.3

(51) Int. Cl.
*G06F 3/06* (2006.01)

(52) U.S. Cl.
CPC .......... *G06F 3/0634* (2013.01); *G06F 3/0619* (2013.01); *G06F 3/0659* (2013.01); *G06F 3/0688* (2013.01)

(58) Field of Classification Search
CPC .... G06F 3/0634; G06F 3/0619; G06F 3/0659; G06F 3/0688
See application file for complete search history.

(56) References Cited

U.S. PATENT DOCUMENTS

| | | | | |
|---|---|---|---|---|
| 5,734,814 A | * | 3/1998 | Corbin | G06F 12/0866 711/E12.019 |
| 2006/0143407 A1 | * | 6/2006 | Humlicek | G06F 12/0804 711/143 |
| 2013/0227219 A1 | * | 8/2013 | Ueki | G06F 12/0804 711/E12.017 |
| 2018/0129600 A1 | * | 5/2018 | Ishiyama | G06F 11/1076 |

* cited by examiner

*Primary Examiner* — Eric Cardwell
(74) *Attorney, Agent, or Firm* — Hanley, Flight & Zimmerman, LLC

(57) ABSTRACT

The present application discloses example operating methods for memory controllers, memory controllers, systems, and electronic devices. The operating methods include: in response to a working mode switching command, determining a state of redundancy check data in a redundancy check cache of a memory controller, and the redundancy check data being used for data recovery of a corresponding storage area in a memory array; and backing up the redundancy check data in the state of an updated state into a backup area of the memory array. Other examples are described.

20 Claims, 10 Drawing Sheets

S701 — IN RESONSE TO A WORKING MODE SWITCHING COMMAND, DETERMINING A STATE OF REDUNDANCY CHECK DATA IN A REDUNDANCY CHECK CACHE OF THE MEMORY CONTROLLER, THE REDUNDANCY CHECK DATA BEING USED FOR DATA RECOVERY OF A CORRESPONDING STORAGE AREA IN THE MEMORY ARRAY

S702 — BACKING UP THE REDUNDANCY CHECK DATA IN THE STATE OF AN UPDATED STATE INTO A BACKUP AREA OF THE MEMORY ARRAY

100

| Page | Die0 | | | | Die1 | | | |
|---|---|---|---|---|---|---|---|---|
| | PL0 | PL1 | PL2 | PL3 | PL0 | PL1 | PL2 | PL3 |
| p0 | | | | | | | | |
| p1 | | | | | | | | |
| p2 | | | | | | | | |
| ...... | | | | | | | | |
| p15 | | | | | | | | |
| p16 | | | | | | | | |
| p17 | | | | | | | | |
| p18 | | | | | | | | |
| p19 | | | | | | | | |
| p20 | | | | | | | | |
| ...... | | | | | | | | |
| p33 | | | | | | | | |
| p34 | | | | | | | | |
| p35 | | | | | | | | |
| ...... | | | | | | | | |
| ...... | | | | | | | | |
| p270 | | | | | | | | P |
| p271 | | | | | | | | P |
| p272 | | | | | | | | P |
| ...... | | | | | | | | P |
| p285 | | | | | | | | P |
| p286 | | | | | | | | P |
| p287 | | | | | | | | P |

Write round 0: p0–p17
Write round 1: p18–p35
Write round 15: p270–p287

One Fund

FIG. 9

OPERATING METHODS, MEMORY CONTROLLERS, AND MEMORY SYSTEMS

RELATED APPLICATIONS

This application claims priority to and the benefit of Chinese Patent Application No. 202211485510.3, filed on Nov. 24, 2022, which is hereby incorporated by reference in its entirety.

TECHNICAL FIELD

The present application relates to the technical field of data storage, and in particular, to an operating method for a memory controller, a memory controller, a system, and an electronic device.

BACKGROUND

In a memory system, the switching of some working modes may result in a loss of data that is being used in a memory controller contained in the memory system, for example, when switching to a stop start unit (SSU, Stop Start Unit) mode or an auto-standby (Auto-standby) mode or a write booster (WB, Write Booster) mode, important data in a cache contained in the memory controller may be lost, especially data required for redundancy check. Since data backup is a basis for disaster tolerance, the data needs to be backed up for subsequent data reconstruction. The currently used data backup mode leads to a relatively small over provisioning (OP, Over Provisioning) of the memory system, thus affecting the programming performance.

BRIEF DESCRIPTION OF THE DRAWINGS

FIG. 9 illustrates a schematic diagram of a RAIN according to some examples of the present application;

DETAILED DESCRIPTION

Figure 1:
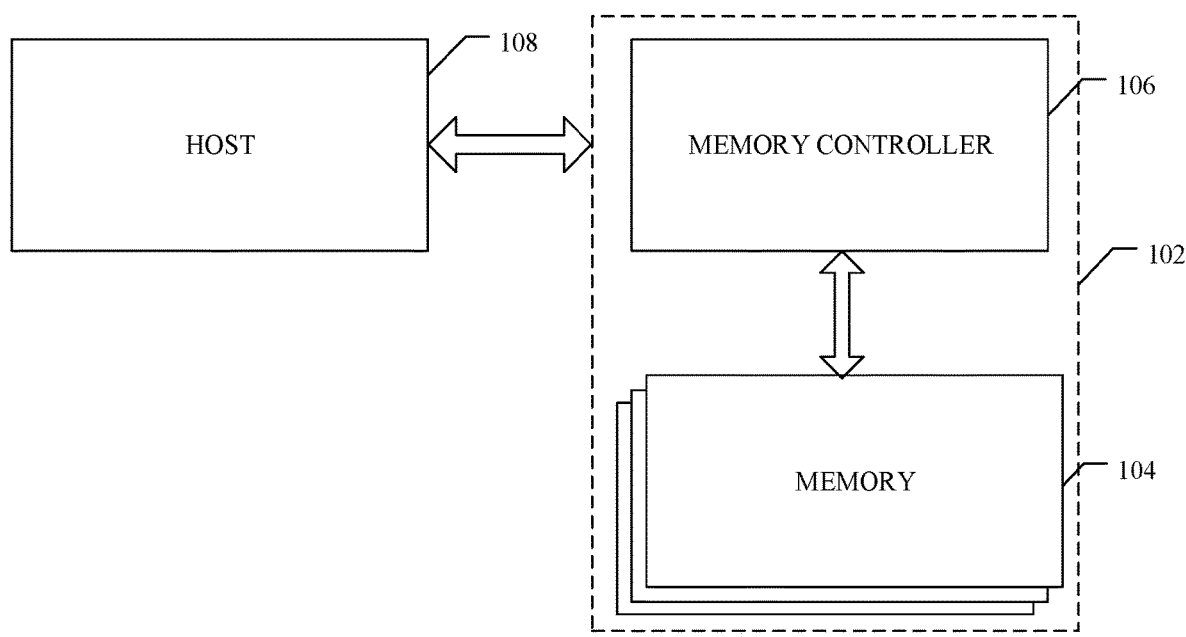
FIG. 1 illustrates a schematic diagram of an example system with a memory system.

Example implementations disclosed in the present application will be described in more detail below with reference to the drawings. Although the example implementations of the present application are shown in the drawings, it should be understood that, the present application may be implemented in various forms and should not be limited to specific implementations set forth herein. Rather, these implementations are provided to understand the present application more thoroughly, and to fully convey the scope disclosed in the present application to those skilled in the art.

In the following description, numerous specific details are given to provide a more thorough understanding of the present application. However, it is apparent to those skilled in the art that the present application may be implemented without one or more of these details. In other examples, in order to avoid confusion with the present application, some technical features well known in the art are not described; that is, not all features of the actual examples are described herein, and well-known functions and structures are not described in detail.

In the drawings, the sizes of layers, areas and elements, and their relative sizes may be exaggerated for clarity. The same reference signs denote the same elements all the time.

It should be understood that, when an element or layer is referred to as being "on", "adjacent to", "connected to" or "coupled to" other elements or layers, it may be directly on, adjacent to, connected to or coupled to the other elements or layers, or there may be an intervening element or layer. In contrast, when an element is referred to as being "directly on", "directly adjacent to", "directly connected to" or "directly coupled to" the other elements or layers, there is no intervening element or layer. It should be understood that, although terms first, second, third and the like may be used to describe various elements, components, areas, layers and/or portions, these elements, components, areas, layers and/or portions should not be limited by these terms. These terms are only used to distinguish one element, component, area, layer or portion from another element, component, area, layer or portion. Thus, without departing from the teachings of the present application, a first element, component, area, layer or portion discussed below may be represented as a second element, component, area, layer or portion. However, when the second element, component, area, layer or portion is discussed, it does not indicate that there is necessarily a first second element, component, area, layer or portion in the present application.

Spatial relationship terms, for example, "underneath", "below", "under", "beneath", "above", "on", and the like may be used herein for the convenience of description, so as to describe the relationship between one element or feature shown in the figures with other elements or features. It should be understood that, in addition to the orientations shown in the figures, the spatial relationship terms are also intended to include different orientations of devices in use and operation. For example, if the devices in the figures are turned over, then the elements or features described as being "below" or "under" or "beneath" other elements will be oriented "on" the other elements or features. Thus, the example terms "below" and "under" may include both an upper orientation and a lower orientation. The device may additionally be oriented (rotated by 90 degrees or in other orientations), and the spatial descriptors used herein are interpreted accordingly.

The terms used herein are for the purpose of describing examples only and are not used as limitations to the present application. As used herein, singular forms "a", "an" and "the" are intended to include plural forms as well, unless the context clearly indicates otherwise. It should also be understood that, the terms "composed" and/or "include", when used in the specification, determine the presence of features, integers, steps, operations, elements and/or components, but do not preclude the presence or addition of one or more other features, integers, steps, operations, elements, components and/or groups. As used herein, the term "and/or" includes any and all combinations of related listed items.

In order to understand the features and technical content of the examples of the present application in more detail, the implementation of the examples of the present application will be described in detail below in combination with the drawings, and the appended drawings are for reference only and are not intended to define the examples of the present application.

FIG. 1 illustrates a block diagram of an example electronic device with a memory system. In FIG. 1, the electronic device 100 may be a mobile phone, a desktop computer, a laptop computer, a tablet computer, a vehicle computer, a game console, a printer, a positioning device, a wearable electronic device, a smart sensor, a virtual reality (VR, Virtual Reality) device, an augmented reality (AR, Argument Reality) device, or any other suitable electronic devices having memories therein. As shown in FIG. 1, the electronic device 100 may include a host 108 and a memory system 102, wherein the memory system 102 has one or more memories 104 and a memory controller 106; and the host 108 may be a processor of the electronic device, such as a central processing unit (CPU, Central Processing Unit) or a system on chip (SoC, System of Chip), wherein the system on chip may be an application processor (AP, Application Processor). The host 108 may be configured to send data to the memory 104 through the memory controller 106 or receive data from the memory 104 through the memory controller 106. In some examples, the memory 104 may be any memory disclosed in the present application. For example, a phase change random access memory (PCRAM, Phase Change Random Access Memory), a three-dimensional NAND flash memory, etc.

According to some implementations, the memory controller 106 is coupled to the memory 104 and the host 108, and is configured to control the memory 104. The memory controller 106 may manage data stored in the memory 104 and communicate with the host 108. In some examples, the memory controller 106 is designed to operate in a low duty-cycle environment, such as a secure digital (SD, Secure Digital) card, a compact flash (CF, Compact Flash) card, a universal serial bus (USB, Universal Serial Bus) flash memory driver, or other media for use in electronic devices in the low duty cycle environment, such as personal calculators, digital cameras, mobile phones and the like. In some examples, the memory controller 106 is designed to operate in a high duty-cycle environment, for example, solid state drive (SSD, Solid State Drive) or an embedded multimedia card (eMMC, embedded Muti Media Card), wherein the SSD or eMMC serves as a data memory and an enterprise memory array of mobile devices in the high duty cycle environment, such as smartphones, tablet computers and laptop computers, etc. The memory controller 106 may be configured to control the operations of the memory 104, such as read, erase, and programming operations.

In some examples, the memory controller 106 may also be configured to manage various functions regarding data that is stored in or to be stored in the memory 104, wherein these functions include, but are not limited to, bad-block management, garbage collection, logical-to-physical address conversion, wear leveling, etc. In some implementations, the memory controller 106 is further configured to process an error correction code (ECC, Error Correction Code) with respect to data that is read from the memory 104 or written into the memory 104. In some examples, the memory controller 106 may also execute any other suitable functions, such as formatting the memory 104. The memory controller 106 may communicate with an external device (e.g., the host 108) according to a particular communication protocol. For example, the memory controller 106 may communicate with the external device through at least one of various interface protocols, such as a USB protocol, an MMC protocol, a peripheral component interconnect (PCI, Peripheral Component Interconnection) protocol, a PCI express (PCI-E, PCI Express) protocol, an advanced technology attachment (ATA, Advanced Technology Attachment) protocol, a serial ATA protocol, a parallel ATA protocol, a small computer small interface (SCSI, Small Computer Small Interface) protocol, an enhanced small disk interface (ESDI, Enhanced Small Disk Interface) protocol, an integrated drive electronics (IDE, Integrated Drive Electronics) protocol, a Firewire protocol, etc. These interfaces may also be referred to as front-end interfaces. In some examples, the memory controller 106 perform exchange of commands/data with the memory 104 through a plurality of configured channels. These channels are also referred to as back-end interfaces.

Figure 2:
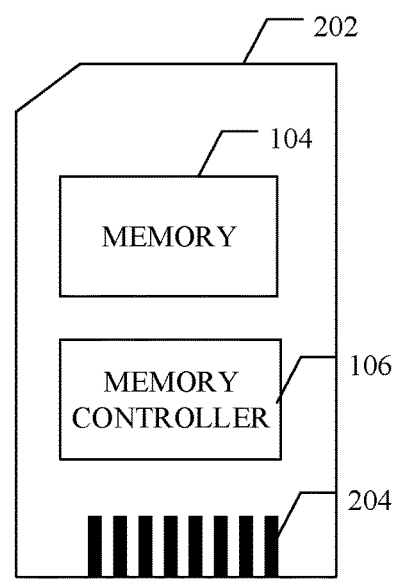
FIG. 2 illustrates a schematic diagram of an example memory card with a memory.

In some examples, the memory controller 106 and one or more memories 104 may be integrated into various types of storage devices, for example, being included in the same package (e.g., a universal flash storage (UFS, Universal Flash Storage) package or an eMMC package). That is, the memory system 102 may be implemented and packaged into different types of terminal electronic products. In one example as shown in FIG. 2, the memory controller 106 and a single memory 104 may be integrated into a memory card 202. The memory card may include a PC card (PCMCIA, Personal Computer Memory Card International Association), a CF card, a smart media (SM) card, a memory stick, a multimedia card (MMC, RS-MMC, MMCmicro), an SD card (SD, miniSD, microSD, SDHC), a UFS, etc. The memory card may also include a memory card connector 204 for coupling the memory card with a host (e.g., the host 108 in FIG. 1).

Figure 3:
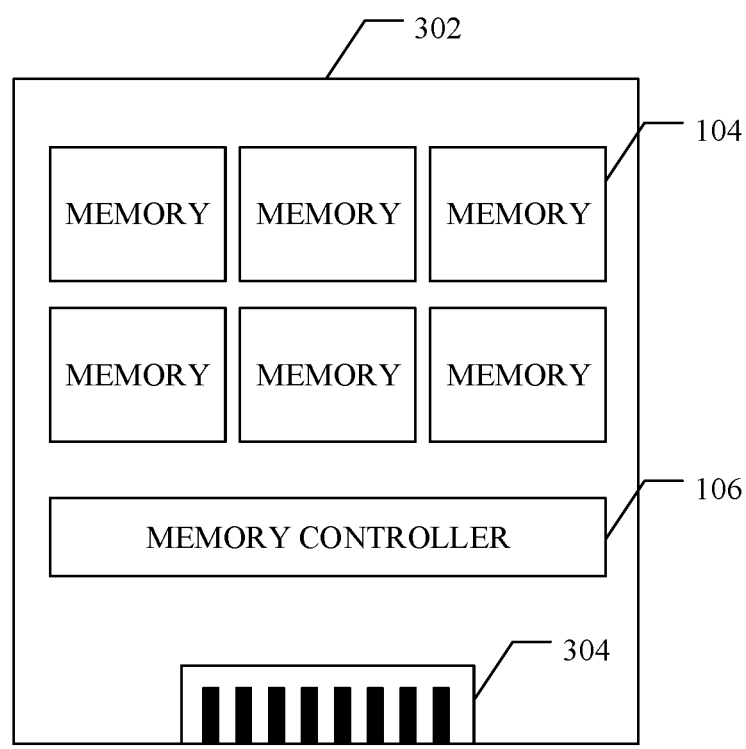
FIG. 3 illustrates a schematic diagram of an example solid state disk (SSD) with a memory.

In another example as shown in FIG. 3, the memory controller 106 and a plurality of memories 104 may be integrated into an SSD 302. The SSD 302 may also include an SSD connector 304 for coupling the SSD with a host (e.g., the host 108 in FIG. 1). In some examples, the storage capacity and/or operating speed of the SSD is greater than the storage capacity and/or operating speed of the memory card.

Figure 4:
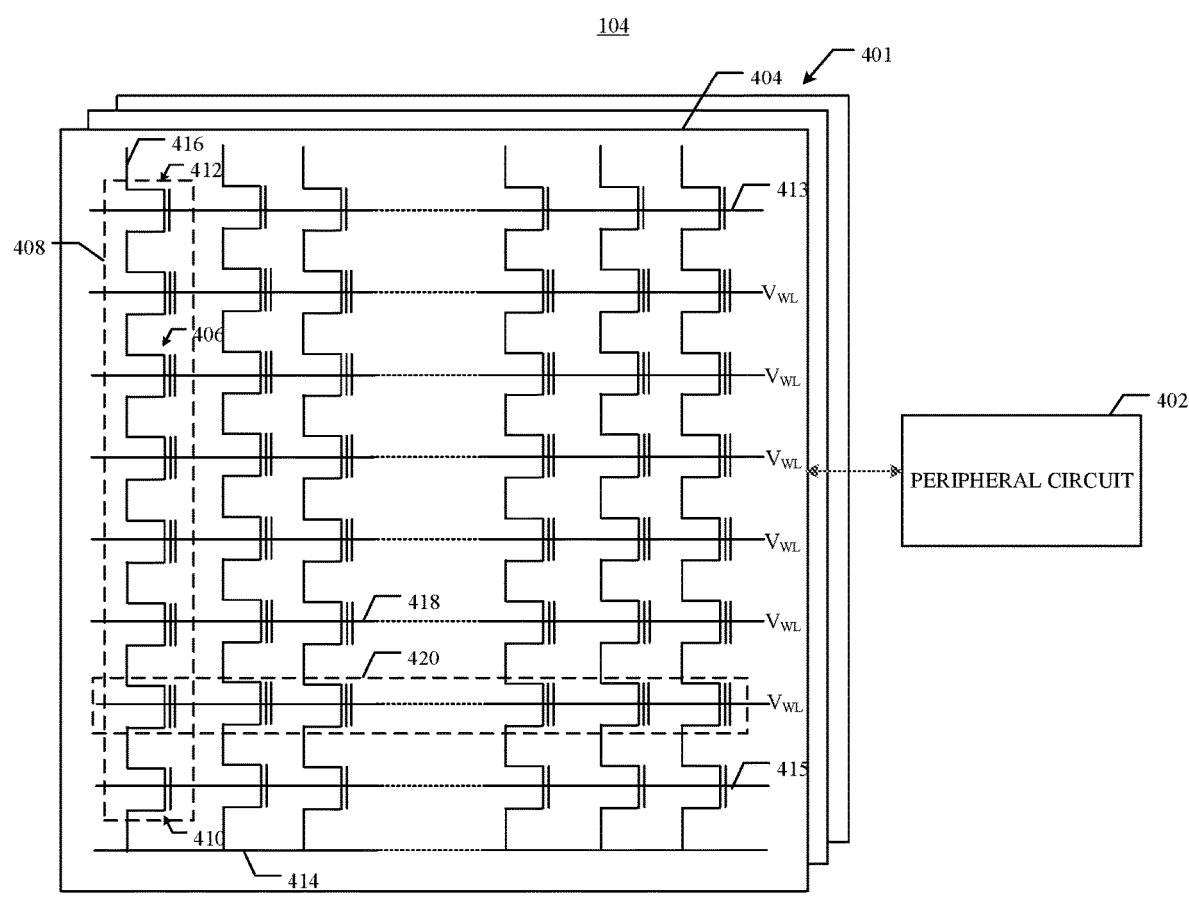
FIG. 4 illustrates an example diagram of an example memory containing a peripheral circuit.

In some examples, the structure of the memory 104 may, as shown in FIG. 4, illustrate an example memory containing a peripheral circuit. As shown in FIG. 4, the memory 104 may include a memory array 401 and a peripheral circuit 402 coupled with the memory array 401. In some examples, the memory array 401 may be a NAND flash memory array. The memory array 401 comprises a memory cell 406 provided in the form of an array of NAND memory strings 408, each NAND memory string 408 extends vertically above a substrate (not shown). In some examples, each NAND memory string 408 includes a plurality of memory cells 406 that are coupled in series and stacked vertically. Each memory cell 406 may maintain a continuous analog value, such as a voltage or charge, depending on the count of electrons trapped within the storage area of the memory cell 406. Each memory cell 406 may be a floating gate type memory cell including a floating gate transistor, or a charge trap type memory cell including a charge trap transistor.

In some examples, each memory cell 406 is a single-level cell (SLC, Single-level Cell) that has two possible data states and thus may store one bit of data. For example, a first data state "0" may correspond to a first voltage range, and a second state "1" may correspond to a second voltage range. In some examples, the first voltage range and the second voltage range may be referred to threshold voltage distributions of the memory cells. In some examples, each memory cell 406 is a multi-level cell (MLC, Multi Level Cell) that has more than four data states and store a plurality of bits of data. For example, the MLC may store two bits in each memory cell, each memory cell stores three bits (also referred to as a tertiary level cell (TLC, Trinary Level Cell), or each memory cell stores four bits (also referred to as a quadruple level cell (QLC, Quadruple Level Cell), etc. The data states of any type of memory cell include an erased state and a programmed state. In some examples, when a program operation is executed on the memory cell, the memory cell in the erased state is programmed to a certain programmed state, and generally, a voltage value in the voltage range corresponding to the programmed state of the memory cell is relatively large.

As shown in FIG. 4, each NAND memory string 408 may include a source selection gate (SSG) 410 at its source terminal and a drain selection gate (DSG) 412 at its drain terminal. The SSG 410 and the DSG 412 may be configured to activate selected NAND memory strings 408 (columns in an array) during read and program (or write) operations. In some examples, the sources of the NAND memory strings 408 in the same block 404 are coupled by the same source line (SL) 414 (e.g., a common SL). In other words, according to some implementations, all NAND memory strings 408 in the same block 404 have an array common source (ACS). According to some implementations, the DSG 412 of each NAND memory string 408 is coupled to a corresponding bit line 416, and data may be read from or written into the bit line 416 via an output bus (not shown). In some examples, each NAND memory string 408 is configured to be selected or deselected by applying a select voltage (e.g., higher than a threshold voltage of a transistor with the DSG 412) or a deselect voltage (e.g., 0 volt (V)) to the corresponding DSG 412 via one or more DSG lines 413, and/or by applying a select voltage (e.g., higher than the threshold voltage of a transistor with the SSG 410) or a deselect voltage (e.g., 0V) to the corresponding SSG 410 via one or more SSG lines 415.

As shown in FIG. 4, the NAND memory strings 408 may be organized into a plurality of blocks 404, each of the plurality of blocks 404 may have a common source line 414 (e.g., coupled to the ground). In some examples, each block 404 is a basic data unit for an erase operation, that is, all memory cells 406 on the same block 404 are erased simultaneously. To erase the memory cells 406 in a selected block 404, the source line 414 coupled to the selected block 404 as well as unselected blocks 404 in a same plane as the selected block 404 may be biased with an erase voltage (Vers) (e.g., a high positive voltage of 20V or higher). In some examples, an erase operation may be executed at a half-block level, at a quarter-block level, or at a level having any suitable count of blocks or any suitable fraction of the blocks. The memory cells 406 of adjacent NAND memory strings 408 may be coupled by word lines 418, and the word line 418 selects which row of the memory cells 406 to receive the read and programming operations. In some implementations, the memory cells 406 coupled to the same word line 418 are referred to as pages 420. The page 420 is a basic data unit for the program operation or the read operation, and the size of one page 420 in bits may be related to the count of NAND memory strings 408, which are coupled by the word lines 418, in one block 404. Each word line 418 may include a plurality of control gates (gate electrodes) at each memory cell 406 in the respective page 420, and a gate line for coupling the control gates.

Figure 5:
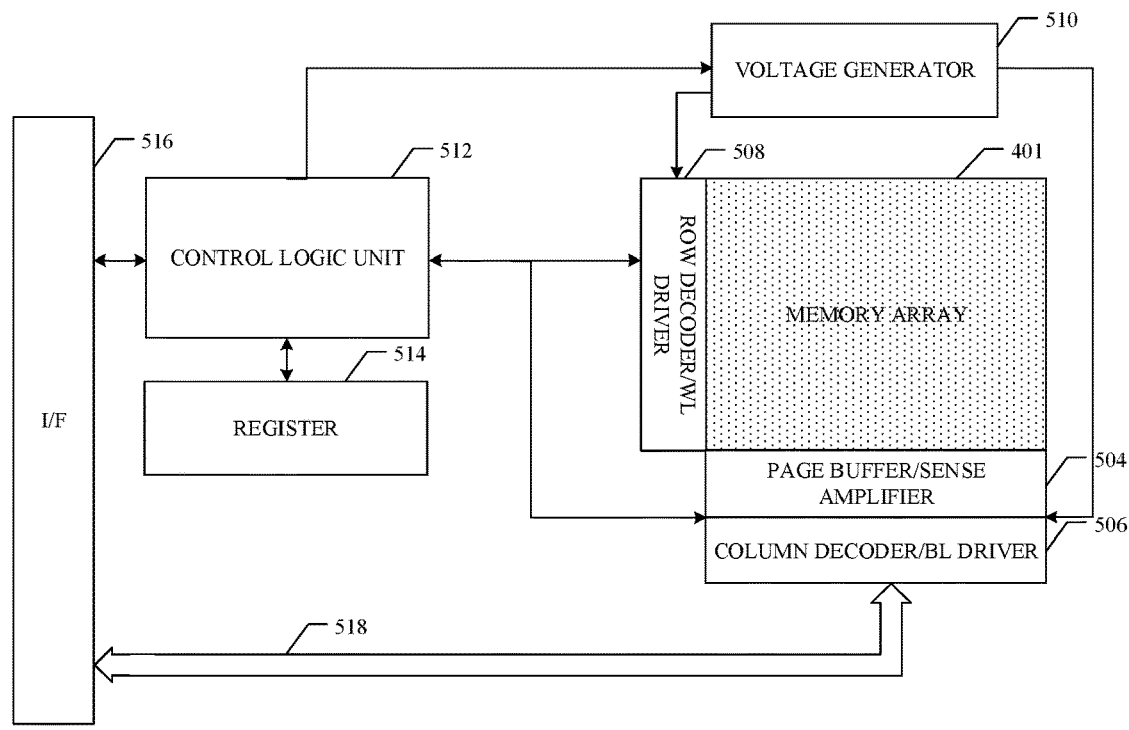
FIG. 5 illustrates a schematic diagram of an example memory containing a memory array and a peripheral circuit.

Referring back to FIG. 4, the peripheral circuit 402 may be coupled to the memory array 401 via the bit line 416, the word line 418, the source line 414, the SSG line 415, and the DSG line 413. The peripheral circuit 402 may include any suitable analog, digital, and hybrid signal circuits, so as to promote an operation of the memory array 401 by applying a voltage signal and/or a current signal to each target memory cell 406 and sensing the voltage signal and/or the current signal from each target memory cell 406, via the bit line 416, the word line 418, the source line 414, the SSG line 415, and the DSG line 413. The peripheral circuit 402 may include various types of peripheral circuits formed by using the metal-oxide-semiconductor (MOS) technology. For example, FIG. 5 illustrates some example peripheral circuits, the peripheral circuit 402 includes a page buffer/sense amplifier 504, a column decoder/bit line (BL) driver 506, a row decoder/word line (WL) driver 508, a voltage generator 510, a control logic 512, a register 514, an interface 516, and a data bus 518. In some examples, additional peripheral circuits not shown in FIG. 5 may also be included.

In some examples, the page buffer/sense amplifier 504 may be configured to read data from the memory array 401 and program (write) data into the memory array 401 according to a control signal from the control logic 512. In one example, the page buffer/sense amplifier 504 may store a page of programmed data (written data) to be programmed into one page 420 of the memory array 401. In another example, the page buffer/sense amplifier 504 may execute a programming verification operation, so as to ensure that data has been correctly programmed into the memory cell 406, which is coupled to the selected word line 418. In yet another example, the page buffer/sense amplifier 504 may also sense a low-power signal that is from the bit line 416 and represents a data bit stored in the memory cell 406, and amplify a small voltage swing to an identifiable logic level in a read operation. The column decoder/bit line driver 506 may be configured to be controlled by the control logic unit 512, and select one or more NAND memory strings 408 by applying a bit line voltage generated from the voltage generator 510.

The row decoder/word line driver 508 may be configured to be controlled by the control logic unit 512, and select/deselect the block 404 of the memory array 401 and select/deselect the word line 418 of the block 404. The row decoder/word line driver 508 may also be configured to drive the word line 418 by using a word line voltage generated from the voltage generator 510. In some implementations, the row decoder/word line driver 508 may also select/deselect, and drive the SSG line 415 and the DSG line 413. In some examples, the row decoder/word line driver 508 is configured to execute an erase operation on the memory cell 406 that is coupled to (one or more) selected word lines 418. The voltage generator 510 may be configured to be controlled by the control logic unit 512, and generate a word line voltage (e.g., a read voltage, a program voltage, a pass voltage, a local voltage, a verification voltage, etc.), a bit line voltage, and a source line voltage to be supplied to the memory array 401.

The control logic unit 512 may be coupled to each peripheral circuit described above and be configured to control the operation of each peripheral circuit. The register 514 may be coupled to the control logic unit 512, and include a state register, a command register and an address register, so as to store state information, a command operation code (OP code) and a command address for controlling the operation of each peripheral circuit. The interface (I/F) 516 may be coupled to the control logic unit 512 and serve as a control buffer, so as to buffer a control command received from a host (not shown) and relay the same to the control logic unit 512, and to buffer state information received from the control logic unit 512 and relay the state information to the host. The interface 516 may also be coupled to the column decoder/bit line driver 506 via the data bus 518, and serve as a data I/O interface and a data buffer, so as to buffer the data and relay the same to the memory array 401 or relay or buffer the data from the memory array 401. That is, the interface 516 herein is an interface that is coupled with the back-end interface of the foregoing memory controller, that is, the interface 516 may also be an interface for realizing the communication between the memory and the memory controller.

The introduction to the memory array in FIG. 4 is an example based on the physical structure of the memory. In other words, the memory array in FIG. 4 is a position where data is actually stored, therefore the address of data storage is a physical address (PA, Physical Address), which may also be referred to as an actual address of the memory array. In practical applications, for the electronic device as shown in FIG. 1, a user may allocate a logical address (LA, Logical Address) by means of an operating system (OS, Operating System) contained in the host 108, and write data into a corresponding physical address of the memory array by means of a translation algorithm between the logical address and the physical address of a flash translation layer (FTL, Flash Translation Layer) in the memory system 102, or read data from a respective physical address of the memory array.

In some examples, the number of Blocks included in the memory array of the memory system contained in the electronic device 100 is fixed. Generally, before memory system (such as the aforementioned SSD or UFS) leave factories, manufacturers divide the memory arrays contained in the memory according to usage. In some examples, the memory arrays of the memory are divided into a user data pool (User Data Pool) and a system pool (System Pool), wherein the user data pool further includes a storage area and an over provisioning (OP), and the storage area is an area in the memory array for storing user data. The capacity of the storage area is also referred to as a user capacity. The user may write data into the storage area, and may also read data from the storage area, that is, the user may access the storage area. The OP may refer to an area, which is reserved by the manufacturer before the memory system leaves the factory and the usage of which is not planned, this part of area cannot be accessed by the user, and the host OS does not display a part of capacity, which is completely used by the memory controller of the SSD.

Here, the system pool may refer to an area in the memory that is planned to store management data. The management data may be, but is not limited to, a logical address to physical address translation (L2P, logical address to physical address) mapping table, which needs to be used by the FTL algorithm, a cached data backup of the memory controller, etc.

In some examples, the user data pool, the system pool and the over provisioning may have the following relationship: when the actual capacity of the memory is fixed, the greater the capacity allocated to the system pool is, the smaller the capacity allocated to the user data pool is, and at this time, if the user capacity is unchanged, the smaller the over provisioning is; and otherwise, when the actual capacity of the memory is fixed, the smaller the capacity allocated to the system pool is, the greater the capacity allocated to the user data pool is, and at this time, if the capacity of the user capacity is unchanged, the greater the over provisioning is. In some examples, the memory with a relatively large over provisioning may improve the performance and often improve the durability of the memory, which helps to prolong the service life of the memory. Based on the above relationship, when the actual capacity of the memory is fixed, in order to improve the performance and the durability of the memory while guaranteeing the user capacity, the capacity allocated to the system pool may be appropriately reduced.

Figure 6:
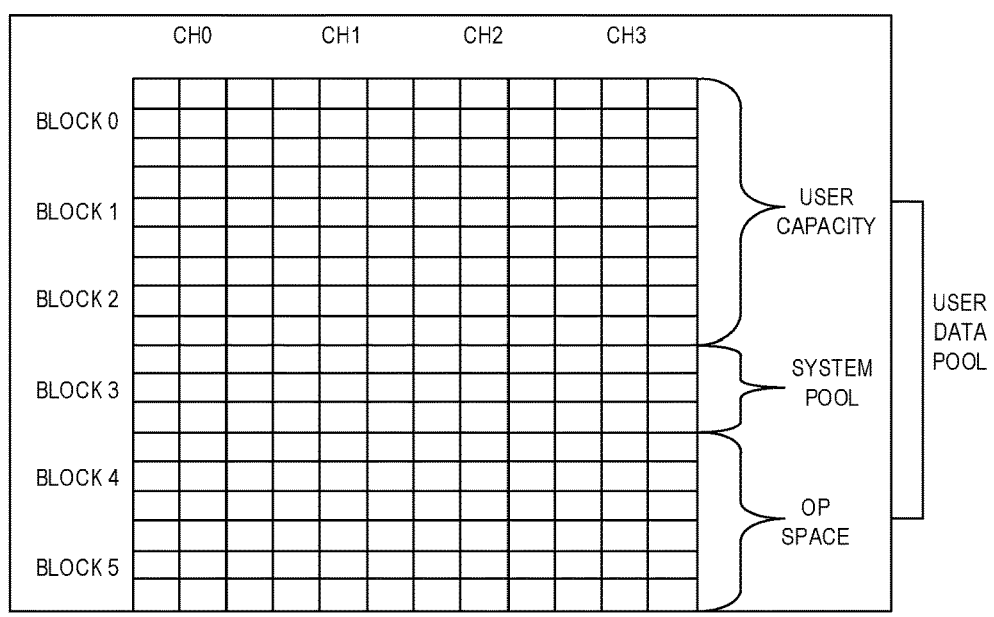
FIG. 6 illustrates a schematic diagram of a dummy mini SSD according to some examples of the present application.

For example, a dummy mini SSD as shown in FIG. 6. As shown in FIG. 6, it is assumed that one SSD contains four channels (CH0-CH3), which are connected with four Dies (the Die on each channel may perform parallel operation), it is assumed that each Die has 6 flash memory blocks (Block0-Block 5), and the SSD contains 24 flash memory blocks (Block) in total. There are 9 small square blocks in each flash memory block, and the size of each small square block is the same as the size of a logical page. In this scenario, one planning mode may be as follows: in the foregoing 24 flash memory blocks, it is assumed that the size of 12 flash memory blocks therein (for example, Block0-Block 2) is the SSD capacity (or the user capacity), and the user may access the flash memory blocks with this capacity. The other 4 flash memory blocks (Block3) are allocated to the system pool; and at this time, the over provisioning (OP) contains 8 flash memory blocks (Block4-Block5). If the user capacity is unchanged and is still 12 flash memory blocks, and if 8 flash memory blocks (assuming Block3-Block4) are allocated to the system pool, at this time, there are only 4 flash memory blocks (assuming Block5) remaining in the over provisioning (OP) space.

Based on the foregoing memory system and the electronic device, after the memory controller contained in the memory system receiving some working mode switching commands and before performing working mode switching, data in a cache of the memory controller are backed up, so as to prevent data loss. For example, when encountering the working mode switching situation, redundancy check data in a redundancy check cache of the memory controller needs to be backed up into the memory array, so as to prevent that user data cannot be read due to data loss. However, the currently used backup mode for the redundancy check data leads to relatively large occupation of the backed up redundancy check data in a backup area, and since the backup area is divided into the system pool, the number of Blocks allocated to the system pool is relatively large, and then the number of Blocks allocated to the user data pool is reduced, so that on the premise of ensuring the user capacity, the over provisioning is reduced, which is not conducive to improving the program performance of the memory system, and reduces the durability of the memory containing the memory system.

Figure 7:
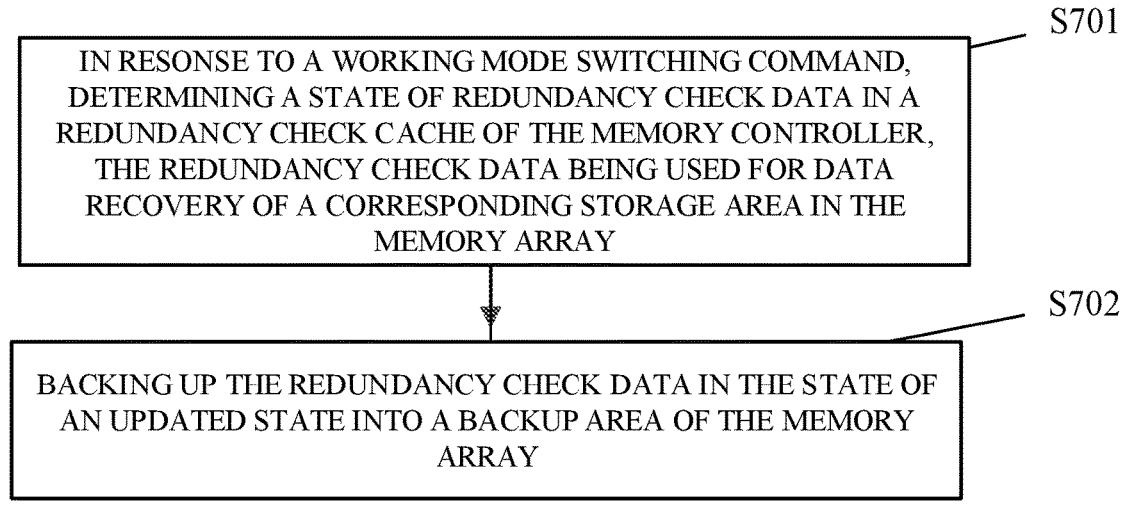
FIG. 7 illustrates a schematic flow diagram of an operating method for a memory controller according to some examples of the present application.

In order to solve the above technical problems, referring to FIG. 7, the examples of the present application provide an operating method for a memory controller. The memory controller is contained in a memory system; and the memory system further includes a memory, and the memory comprises a memory array and is controlled by the memory controller. In some examples, the operating method may include:

S701: in response to a working mode switching command, determining a state of redundancy check data in a redundancy check cache of the memory controller, and the redundancy check data being used for data recovery of a corresponding storage area in the memory array; and S702: backing up the redundancy check data in the state of an updated state to a backup area of the memory array.

The operating method provided in the examples of the present application may be executed on a memory controller (Controller) side. The operation process may include: in response to the working mode switching command, the memory controller determines a state of redundancy check data in the redundancy check cache of the memory controller, and then backs up the redundancy check data in the state of an updated state into the backup area of the memory array. In some examples, after receiving the working mode switching command, and before switching the working mode of the memory system to a target mode, the memory controller first backs up the redundancy check data in the state of an updated state in the redundancy check cache, which is contained in the memory controller, into the backup area of the memory array. Compared with the backup mode of backing up all redundancy check data in the redundancy check cache, by means of this backup mode of only backing up the redundancy check data in the state of an updated state into the backup area, not only can the occurrence of duplicate backup be excluded; and moreover, since the backup data size is reduced, the usage amount of the backup area is reduced, the backup area belongs to the foregoing system pool, based on this, the number of blocks allocated to the system pool may be appropriately reduced, then the number of blocks allocated to the user data pool is increased, accordingly, on the premise of ensuring the user capacity, the over provisioning of the memory array may be increased, so that the write acceleration is relatively small, and the service life of the storage device may be prolonged. In addition, for quick backup, the memory cell of the backup area is configured to be an SLC type, and after the backup data size is reduced, the erase count (EC, Erase Count) of the backup area is reduced, thereby improving the performance and the durability of the storage device containing the memory controller.

Here, the working mode switching command may include one of: a stop start unit (SSU) mode switching command, an auto-standby mode switching command, or a write booster (WB) mode switching command.

The SSU mode switching command is used by the host to switch a power consumption mode of a device, which is coupled with the host and contains the memory system. For example, when the device coupled with the host is an UFS, the UFS defines four basic power consumption modes: Active, Idle, Power Down, and Sleep (AIDS for short), and the UFS further defines three transition power consumption modes: Pre-Active, Pre-Sleep, and Pre-Power Down. That is, there are seven power consumption modes in total. Wherein, the Active mode: the state the UFS is in when executing a command or a background operation; the Idle mode: the state the UFS is in when the UFS is idle, that is, there is no command from the host, and the UFS itself has no background task to be processed; a Sleep mode: after staying in the Idle mode for a certain time, the sleep mode is performed; and in the sleep mode, a VCC power supply may be cut off (depending on the design of the UFS), that is, the power supply of the memory is cut off. The power down mode: the power-down mode is wherein a power supply supplying power to the UFS stops supplying power to the UFS. In the power-down mode, all power supplies such as VCC, VCQ and VCC1 may be pinched off (depending on the design of the UFS), so that the mode is the most power-saving power consumption mode.

Figure 8:
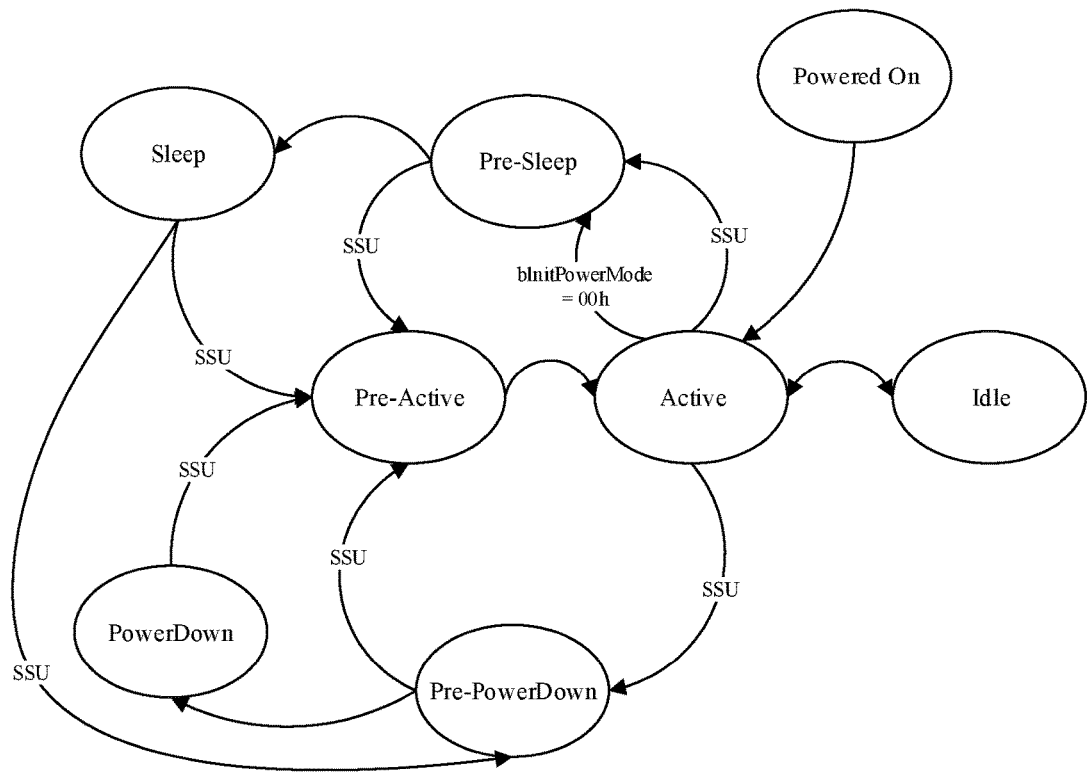
FIG. 8 illustrates a schematic relationship diagram of switching seven included power consumption modes by means of an SSU command according to some examples of the present application, when a device coupled with a host and containing a memory system is a UFS.

With regard to the switching between the seven power consumption modes, as shown in FIG. 8, most switching is performed by using an SSU command as described above, wherein a binitPowerMode parameter defines a power supply mode to which the memory system should convert after completing an initialization phase, and when binitPowerMode=00h, it indicates that the memory system has automatically entered the Sleep mode from the Pre-Sleep mode. The conversion between the various power consumption modes in FIG. 8 conforms to related formulated protocols, and specific protocol content is not described herein again based on the research emphasis of the present application and the limitation of the length. When the UFS is switched to a power-saving mode (e.g., the Idle mode, Sleep mode, Power Down mode), some functions in the UFS cannot be implemented, for example, the memory controller cannot implement functions such as a write operation, a read operation, an erase operation and the like on the memory. Since most of the cache of the memory controller is a volatile memory structure, in order to prevent data loss, there is a need to back up valid data in the memory controller, for example, the redundancy check data in the state of an updated state in the redundancy check cache of the memory controller.

In the auto-standby mode, that is, Auto-Standby, in this mode, the memory system coupled with the host is also in the power-saving mode. At this time, it should back up data that needs to be backed up, before the memory system enters the auto-standby mode.

In the write booster mode, that is, the Write Booster (WB) mode, the Write Booster mode is a new function introduced in the UFS2.2 and UFS3.1 specifications, and the write performance of the UFS is improved by cache writing. In the technical field of the memory system, the write performance of an MLC/TLC/QLC NAND is obviously lower than that of an SLC NAND, this is because a logically defined MLC/TLC/QLC bit requires more programming steps, such that the error correction probability is higher. In some examples, in order to improve the write performance, if the memory array in the memory system is the MLC/TLC/QLC NAND, a part of memory cells is configured to be the SLC NAND and is used as a write buffer (or referred to as a Write Booster Buffer), so as to process a write request at a lower delay to improve the overall write performance. Then, before the memory system is switched to the WB mode, it should back up data that needs to be written into the memory array in the form of MLC/TLC/QLC. For example, the redundancy check data in the state of an updated state in the redundancy check cache of the memory controller may need to be written into the memory array in the form of MLC/TLC/QLC program under normal circumstances, and after receiving the WB mode switching command, the memory controller needs to first back up these redundancy check data in the state of an updated state into the backup area of the memory array.

That is, after the memory controller receives one of the above working mode switching commands, the memory system where the memory controller is located either enter the power-saving working mode or enters the working mode of writing the data into the write buffer in an SLC program mode, and at this time, in order to ensure that the data in the cache of the memory controller is not lost, the data needs to be backed up.

Here, the redundancy check cache may refer to an area in the memory controller for storing the redundancy check data. In some examples, the redundancy check cache contained in the memory controller at least includes an L2 check cache for caching L2 Parity and a GC check cache for caching GC Parity, wherein the L2 Parity may refer to redundancy check data generated by a write command that is sent by a host coupled with the memory controller, and a write operation, which is executed by the memory under the drive of the memory controller in response to the write command, is referred to as L2 Write for short; and an area where the L2 Parity is temporarily stored in the memory controller is referred to as the L2 check cache. The GC Parity may refer to redundancy check data generated due to garbage collection (GC, Garbage Collection), and a write operation, which is executed by the memory under the drive of the memory controller in response to the write command in the GC process, is referred to as GC Write for short; and an area where the GC Parity is temporarily stored in the memory controller is referred to as the GC check cache. In some examples, the L2 Write and GC Write are collectively referred to as first operations herein.

The redundancy check data described in the examples of the present application includes two redundancy check data, that is, L2 Parity and GC Parity. In some examples, the L2 Parity and the GC Parity may be backed up into different backup areas.

Based on this, in the examples of the present application, the determining the state of the redundancy check data in the redundancy check cache of the memory controller may include: determining the state of the L2 parity in the L2 check cache, and determining the state of the GC parity in the GC check cache. Correspondingly, the backing up the redundancy check data in the state of an updated state into the backup area of the memory array may include: backing up the L2 Parity in the updated state into a backup area (which may be referred to as L2 Swap VB for short) for backing up the L2 Parity in the system pool, and backing up the GC Parity in the updated state into a backup area (which may be referred to as GC Swap VB for short) for backing up the GC Parity in the system pool.

In some examples, when the number of bits of error occurring in the storage device exceeds an ECC error correction capability range, the ECC error correction cannot ensure the accuracy of the data. Some enterprise-level storage devices and more and more consumer-level storage devices employ an independent NAND redundant array (RAIN) error correction technique similar to a redundant arrays of independent disks (RAID). In some examples, the RAIN mode of the storage device may be determined according to the architecture of the memory array contained in the storage device or by a designer.

To understand the RAIN, an example structure is shown in FIG. 9 below. As shown in FIG. 9, it may be a Block in a TLC type memory array allocated for storing user data, and may be referred to as a Fund, that is, the Block belongs to the user data pool. It is assumed that the Block contains two Dies, that is, Die 0 and Die 1, each Die includes four Planes (PL for short), for example, the Die 0 includes: PL0, PL1, PL2 and PL3; and as another example, the Die 1 includes: PL0, PL1, PL2 and PL3. Moreover, it is assumed that the Block contains 128 word lines, and if each word line contains 18 logical pages (which belong to 6 physical pages when the memory cell is a TLC), the entire Block contains a total of 2304 logical pages (data pages, i.e., each small block shown in FIG. 9). In addition, the 2304 logical pages contained in the Block are divided into 288 pagelines, which are respectively p0 to p287, each page line is coupled with 8 data pages, so as to form 16 write rounds. Based on this, as shown in FIG. 9, an available RAIN mode is as follows: performing redundant calculation by using data written into 127 logical pages corresponding to several pagelines at corresponding positions of each write round, so as to obtain a corresponding Parity, and storing the Parity at the tail of the Block (or Fund), for example, a logical page written with P at the lower right corner in the last PL (i.e., PL3) in Die 1 as shown in FIG. 9.

For example, assuming that during the write of Write round 0, after data is written into the data pages coupled with p0, one L2 Parity is calculated by using the data of the p0 and the data at corresponding positions (e.g., p18, . . . , p270) of other rounds, and then the L2 Parity is stored in the logical page on the rightmost side of p270. As another example, during the write of Write round 1, after data is written into the 8 logical pages coupled with p18, the L2 Parity is calculated by using the data of the p18 and the data at corresponding positions (e.g., p0 . . . p270) of other rounds, and so on. The write sequence described herein is sequential write, that is, write is performed according to Write round 0, Write round 1.

FIG. 9 is merely an example description of the content of the RAIN technology. The storage device may determine a specific RAIN mode according to the actual capacity and structure.

In some examples, the L2 Parity is generated in the memory controller and is temporarily stored in the redundancy check cache. Then, the L2 Parity is written into a storage area of the memory array from the redundancy check cache; and the storage area belongs to the user data pool. The memory system employs a redundancy error correction technology, which needs an extra space to store the redundancy check data, and thus will definitely consume some user capacity.

Figure 10:
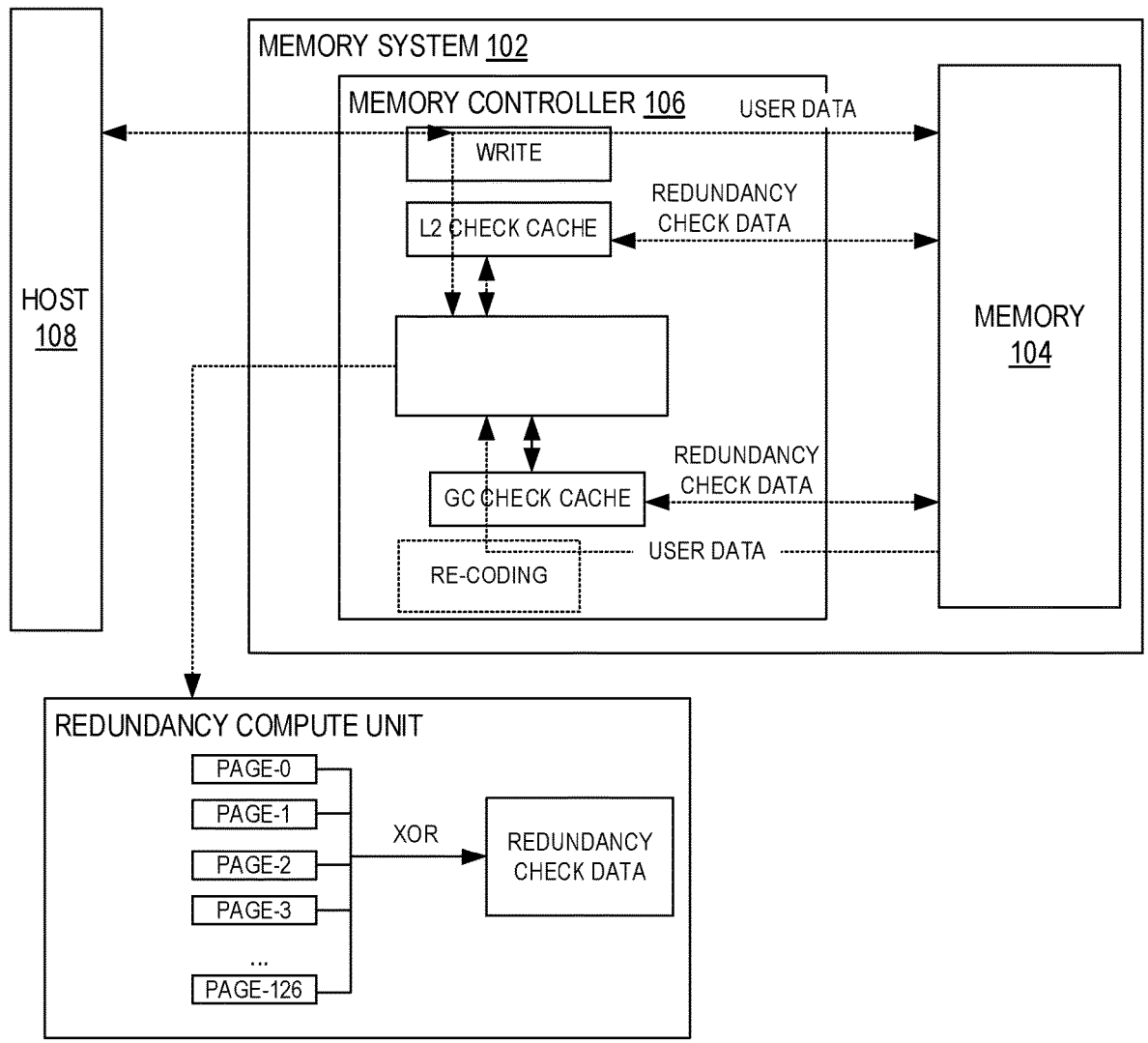
FIG. 10 illustrates a schematic diagram of data interaction between a host and a memory system according to some examples of the present application.

In some examples, the generation and storage of the L2 Parity are described as follows. As shown in FIG. 10, it illustrates a schematic diagram of data interaction between the host and the memory system. In FIG. 10, when the host writes a piece of user data (such as data of one logical page is written, and the logical page corresponds to the foregoing storage area) by means of the memory controller, the memory controller obtains the L2 Parity corresponding to the piece of data by means of the calculation of a redundant calculation unit contained therein, and temporarily stores the L2 Parity in the L2 check cache in the redundancy check cache, and then writes the L2 Parity into a specified storage area of the memory array belonging to the user data pool for subsequent error correction. FIG. 10 also illustrates that during a GC process, when a piece of user data (valid data from garbage collection) in the memory array needs to be re-written into a new logical page, the memory controller reads the user data, re-codes the user data, and recalculates Parity for the piece of user data by means of the redundant calculation unit, and at this moment, the Parity is referred to as the GC Parity. Then, the GC Parity is temporarily stored in the GC check cache, and then the GC Parity is re-stored in the specified storage area of the memory array. It is an example in FIG. 10 that, the RAIN is constructed by using logical pages Page0 to Page126, and the L2 Parity is stored in Page127. There are other RAIN modes and L2 Parity storage modes.

In the present application, in order to back up the redundancy check data in the state of an updated state, in some examples, the determining the state of the redundancy check data in the redundancy check cache of the memory controller may include:

obtaining flag information corresponding to the redundancy check data; and determining the state of the redundancy check data based on the flag information.

In some examples, the flag information includes a first flag or a second flag; and the determining the state of the redundancy check data based on the flag information includes:

when the flag information includes the first flag, determining that the state of the corresponding redundancy check data is a non-updated state; and when the flag information includes the second flag, determining that the state of the corresponding redundancy check data is an updated state.

In some examples, the flag information includes a second flag; and the operating method further includes:

setting, to be the second flag, flag information corresponding to redundancy check data generated by executing a first operation in the redundancy check cache, wherein the state of the redundancy check data corresponding to the second flag is an updated state.

The foregoing process is that the memory controller determines the state of the redundancy check data by obtaining the flag information corresponding to the redundancy check data. When the flag information is the first flag, the state of the redundancy check data is the non-updated state; and when the flag information is the second flag, the state of the redundancy check data is the update stated, wherein the flag information corresponding to the redundancy check data generated by executing the first operation is set to be the second flag.

In some examples, the first operation includes: a write operation triggered by a host coupled with the memory system, and/or a write operation triggered by the memory controller, wherein the write operation triggered by the host coupled with the memory system may be a write operation executed by the memory under the drive of the memory controller in response to a write command sent by the host coupled with the memory controller, that is, the foregoing L2 Write. The write operation triggered by the memory controller may refer to a write operation executed by the memory under the drive of the memory controller while implementing a write command generated in the GC process, that is, the foregoing GC Write.

In other words, in order to implement a backup policy of the present application, a flag bit is set in the examples of the present application. The flag bit is used for storing the flag information corresponding to the redundancy check data, and the flag information is used for indicating the state (the updated state or the non-updated state) of the corresponding redundancy check data.

Figure 11:
FIG. 11 illustrates an example relationship between a logical page of a storage area corresponding to a user data pool and a flag bit according to some examples of the present application.

For example, assuming that the RAIN mode described in FIG. 9 is used, the flag bit setting may refer to FIG. 11. In some examples, FIG. 11 illustrates an example relationship between a logical page corresponding to the user data pool and a flag bit. Based on the RAIN shown in FIG. 9, 18 flag bits (tags), which are tag0 to tag 17, are set in the examples of the present application in total, wherein each Write round includes tag0 to tag17. Therefore, based on the RAIN mode described in FIG. 9, after the data of one logical page is written, the memory controller calculates one Parity, and the tag corresponding to the logical page is set to be the second flag.

For example, as shown in FIG. 11, it is assumed that the write process of the last round (Round 0) has been completed, and the L2 Parity in the memory controller has been backed up or stored at a corresponding position of the user data pool in response to the working mode switching command. In this round (i.e., Round 1), it is assumed that only the data of three logical pages p18 to p20 is written, at this moment, tag0 corresponding to p18 is set to be the second flag; tag1 corresponding to p19 is set to be the second flag; tag2 corresponding to p20 is also set to be the second flag, on this basis, redundant calculation is performed on the data corresponding to p18 and the data at corresponding positions in other rounds (for example, p0, . . . , p270), and the obtained L2 Parity is in the updated state; redundant calculation is performed on the data corresponding to p19 and the data at corresponding positions in other rounds (for example, p1, . . . , p271), and the obtained L2 Parity is in the updated state; and redundant calculation is performed on the data corresponding to p20 and the data at corresponding positions in other rounds (for example, p2, . . . p272), and the obtained L2 Parity is in the updated state, the tag corresponding to the remaining p0 and the like should be the first flag, and the corresponding L2 Parity is in the non-updated state.

That is, in some examples, the flag information further includes a first flag; and the operating method further includes:

after the backup of the redundancy check data generated by executing the first operation, setting, to be the first flag, the flag information corresponding to the redundancy check data generated by executing the first operation, wherein the state of the redundancy check data corresponding to the first flag is the non-updated state.

In some examples, the operating method may further include:

maintaining a redundancy check state table; the redundancy check state table including a mapping relationship between the redundancy check data in the redundancy check cache and the flag information; and the obtaining the flag information corresponding to the redundancy check data includes:

obtaining the flag information corresponding to the redundancy check data according to the redundancy check state table.

A mode of determining the flag information corresponding to the redundancy check data is described herein. The implementation may include: when the memory controller causes the memory to execute the first operation, determining the mapping relationship between the redundancy check data in the redundancy check cache and the flag information, and storing the mapping relationship in chain table (i.e., the redundancy check state table). Then, in the backup process, the memory controller may look up the flag information corresponding to the redundancy check data in the stored redundancy check state table by taking the redundancy check data as an index, wherein the first flag in the flag information may be 0 or 1, and correspondingly, the second flag in the flag information may be 1 or 0, as long as the first flag and the second flag may identify the two states.

In some examples, the backing up the redundancy check data in the state of an updated state into the backup area of the memory array may include:

gradually traversing the redundancy check data in the redundancy check cache, and backing up the redundancy check data for which the flag information is the second flag into the backup area of the memory array; and skip the redundancy check data for which the flag information is the first flag from being backed up, until all the redundancy check data in the redundancy check cache is traversed.

The gradually traversing the redundancy check data in the redundancy check cache may refer to traversing the L2 Parity in the L2 check cache and the GC Parity in the GC check cache, respectively.

In some examples, the memory controller maintains redundancy check data storage tables for the L2 Parity and the GC Parity separately, for example, an L2 storage table and a GC storage table. The traversal mode of each storage table is similar. Here, the L2 storage table is taken as an example for illustration. The L2 storage table may be a chain table. Based on this, each node of the L2 storage table stores storage address information corresponding to the L2 Parity in the L2 check cache and a pointer to the next node. In this case, traversing the L2 Parity in the L2 check cache may include: starting from a root node of the L2 storage table, on the basis of the pointer stored on each node, looking up the address information stored on the node in the L2 storage table one by one, obtaining the L2 Parity corresponding to the address information, backing up the L2 Parity in the updated state into an L2 backup area, and not backing up the L2 Parity in the non-updated state, until all L2 Parity in the L2 check cache is traversed. Therefore, all L2 Parity in the L2 check cache will be traversed and obtained, and then the L2 Parity in the updated state in the L2 check cache is backed up into the L2 backup area. The traversal of the GC Parity in the GC check cache may refer to the backup of all L2 Parity in the L2 check cache described above, and finally the GC Parity in the updated state is backed up into a GC backup area.

Figure 12:
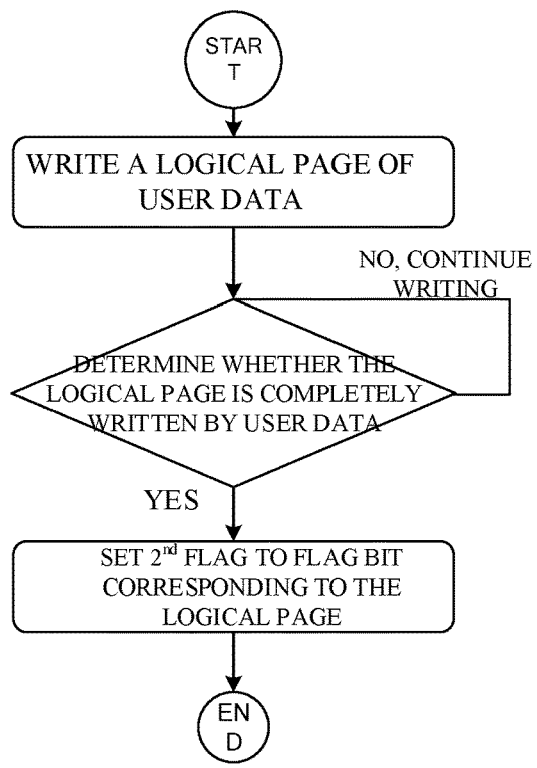
FIG. 12 illustrates a schematic flow diagram of a memory controller for generating flag information corresponding to redundancy check data when executing a first operation according to some examples of the present application.
Figure 13:
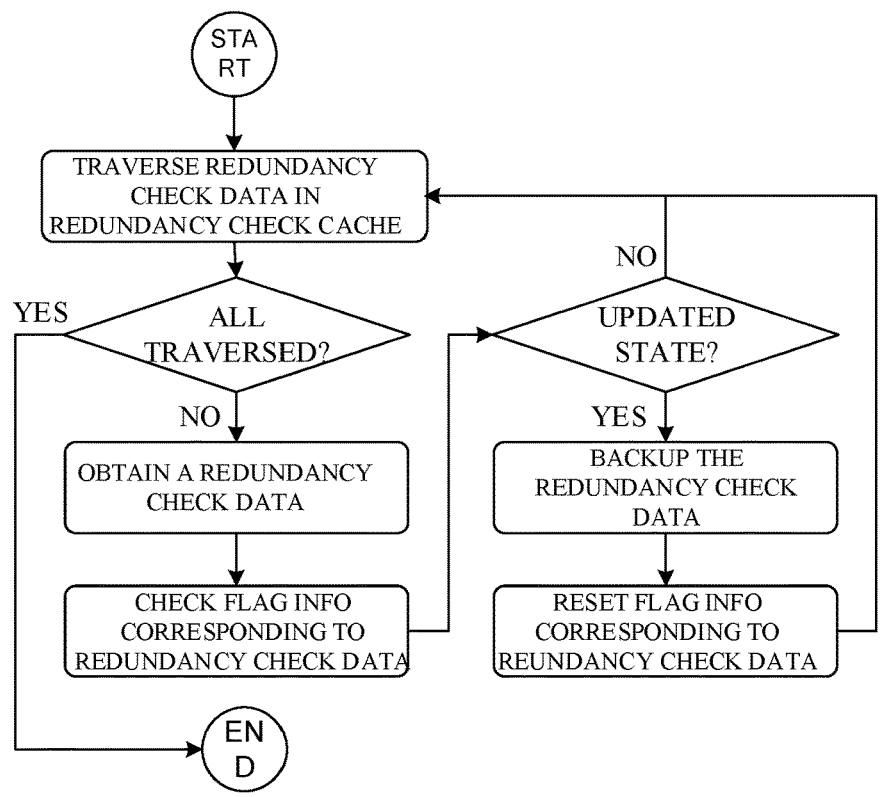
FIG. 13 illustrates a schematic flow diagram of backing up redundancy check data in the state of an updated state a redundancy check cache into a backup area according to some examples of the present application.

Referring to FIG. 12 and FIG. 13, wherein FIG. 12 illustrates a schematic flow diagram of the memory controller for generating the flag information corresponding to the redundancy check data when executing the first operation according to some examples of the present application; and FIG. 13 illustrates a schematic flow diagram of backing up the redundancy check data in the state of an updated state in the redundancy check cache into the backup area according to some examples of the present application.

As shown in FIG. 12, when controlling the memory to execute the first operation (L2 Write and/or GC Write), the memory controller determines whether the user data of one logical page is completely written, and if not, continue to write the user data; and if the user data is completely written, sets the flag position corresponding to the logical page to be the second flag. That is, during L2 write and/or the GC write, after the user data of one logical page is completely written, the flag position corresponding to the data page is the second flag, accordingly, the flag information of the redundancy check data corresponding to the user data stored in the logical page is the second flag, that is, the redundancy check data corresponding to the user data stored in the logical page is in the updated state.

As shown in FIG. 13, in the process of backing up the redundancy check data in the redundancy check cache into the backup area in response to the working mode switching command of one of the following three working modes, that is, SSU, Auto-standby and Write Booster, the memory controller traverses the redundancy check data in the redundancy check cache, so as to obtain each redundancy check data to be backed up, and checks the flag information corresponding to the redundancy check data to be backed up, and when the flag information is the second flag, the state of the corresponding redundancy check data to be backed up is the updated state, the memory controller backs up the corresponding redundancy check data to be backed up into the backup area, and resets, to be the first flag, the flag bit of a logical page corresponding to the redundancy check data to be backed up; and when the flag information is the first flag, the memory controller skip and does not back up the redundancy check data to be backed up, until all redundancy check data in the redundancy check cache is traversed. As described above, the GC Parity and the L2 Parity are backed up separately into different backup areas.

According to the operating method of the memory controller provided by the examples of the present application, by backing up the redundancy check data in the state of an updated state into the backup area without backing up all redundancy check data, the write amount and the usage amount of the backup area are not increased, such that the backup area is saved, and the over provisioning is increased. Moreover, since the memory cell of the backup area is usually an SLC type, by backing up the redundancy check data in the state of an updated state as described above, the usage amount of the backup area is reduced, and the number of erase for the backup area is also reduced, thereby improving the performance and the durability of the product.

The present application further provides a memory controller, and the memory controller is contained in a memory system; the memory system further includes a memory, and the memory comprises a memory array and is controlled by the memory controller; the memory controller includes a processor and a redundancy check cache, wherein, the processor is configured to at least: in response to a working mode switching command, determine a state of redundancy check data in the redundancy check cache of the memory controller; the redundancy check data is used for data recovery of a storage area of a corresponding state in the memory array; and back up the redundancy check data in the state of an updated state into a backup area of the memory array.

In some examples, the processor is further configured to at least: obtain flag information corresponding to the redundancy check data; and determine the state of the redundancy check data based on the flag information.

In some examples, the flag information includes a first flag or a second flag; the processor is further configured to at least: when the flag information includes the first flag, determine that the state of the corresponding redundancy check data is a non-updated state; and when the flag information includes the second flag, determine that the state of the corresponding redundancy check data is an updated state.

In some examples, the flag information includes a second flag; the processor is further configured to at least: set, to be the second flag, flag information corresponding to redundancy check data generated by executing a first operation in the redundancy check cache, wherein the state of the redundancy check data corresponding to the second flag is the updated state.

In some examples, the flag information further includes a first flag; and the processor is further configured to at least: after the backup of the redundancy check data generated by executing the first operation, set, to be the first flag, the flag information corresponding to the redundancy check data generated by executing the first operation, wherein the state of the redundancy check data corresponding to the first flag is the non-updated state.

In some examples, the processor is further configured to at least: maintain a redundancy check state table; the redundancy check state table includes a mapping relationship between the redundancy check data in the redundancy check cache and the flag information; and the processor is further configured to at least: obtain the flag information corresponding to the redundancy check data according to the redundancy check state table.

In some examples, the processor is further configured to at least: gradually traverse the redundancy check data in the redundancy check cache, and back up the redundancy check data for which the flag information is the second flag into the backup area of the memory array; and skip the redundancy check data for which the flag information is the first flag from being backed up, until all the redundancy check data in the redundancy check cache is traversed.

In some examples, the memory controller further includes a first communication interface coupled with a host; and the first communication interface is configured to receive the working mode switching command sent by the host.

In some examples, the memory controller further includes a second communication interface coupled with the memory; and the second communication interface is configured to send, to the memory, a write command carrying the redundancy check data in the state of an updated state.

The first communication interface may be a front-end interface in the foregoing examples; and the second communication interface may be a back-end interface in the foregoing examples.

The memory controller and the foregoing operating method of the memory controller may belong to the same inventive concept. The nouns appearing in the memory controller are explained in detail in the foregoing operating method and the memory controller, which are also applicable herein, and thus details are not described herein again. The structure of the memory controller, which is most relevant to the technical solutions of the present application, is described herein. For the structure and description of the memory controller as shown in FIG. 1 to FIG. 3, the memory controller provided in the present application also contains the same and is also applicable. The memory controller further includes a structure, which is not shown but is required for the normal work of the memory system, and in view of the length of the application file, no repeated description will be given in the present application one by one.

Figure 14:
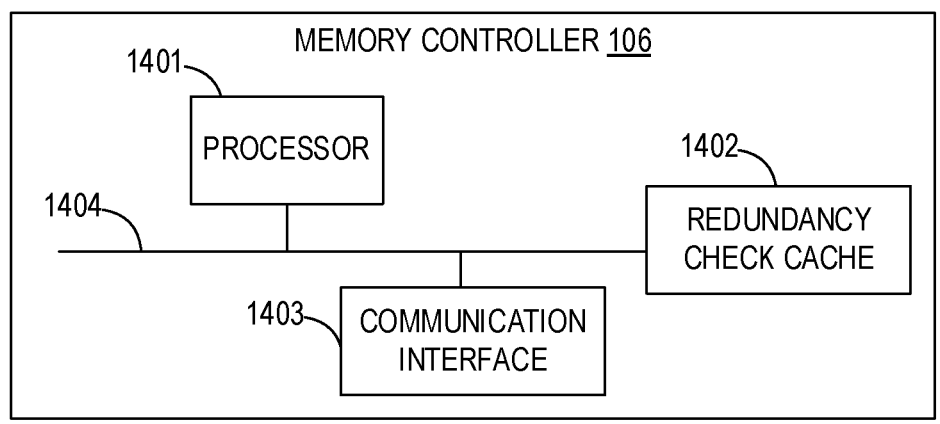
FIG. 14 illustrates a schematic diagram of a hardware structure of a memory controller according to some examples of the present application.

For example, as shown in FIG. 14, it illustrates a schematic diagram of a hardware structure of a memory controller according to some examples of the present application. The memory controller 106 includes: at least one processor 1401, a redundancy check cache 1402, and at least one communication interface 1403 (such as the first communication interface and the second communication interface described above). Various components in the memory controller 106 are coupled together by means of a bus system 1404 used for implementing connection communication between these components. In addition to including the data bus, the bus system 1404 further includes a power bus, a control bus and a state signal bus. Various buses are marked as the bus system 1404 in FIG. 14.

The redundancy check cache 1402 may refer to any one or any combination of three of a first-level cache (L1 cache), a second-level cache (L2 cache) and a third-level cache (L3 cache). The redundancy check cache 1402 at least includes an L2 check cache and a GC check cache.

Other storage structures may also be contained in the memory controller 106, and these storage structures are collectively referred to as an internal storage. The internal storage may be a volatile memory or a non-volatile memory, and may also include both volatile and non-volatile memories. The non-volatile memory may be a read only memory (ROM, Read Only Memory), a programmable read-only memory (PROM, Programmable Read-Only Memory), an erasable programmable read-only memory (EPROM, Erasable Programmable Read-Only Memory), an electrically erasable programmable read-only memory (EEPROM, Electrically Erasable Programmable Read-Only Memory), a ferromagnetic random access memory (FRAM, ferromagnetic random access memory), a flash memory (Flash Memory), a magnetic surface memory, an optical disk, or a compact disc read-only memory (CD-ROM, Compact Disc Read-Only Memory); and the magnetic surface memory may be a magnetic disk memory or a magnetic tape memory. The volatile memory may be a random access memory (RAM, Random Access Memory), which is used as an external cache. By way of example but not by way of limitation, many forms of RAMs are available, such as a static random access memory (SRAM, Static Random Access Memory), a synchronous static random access memory (SSRAM, Synchronous Static Random Access Memory), a dynamic random access memory (DRAM, Dynamic Random Access Memory), a synchronous dynamic random access memory (SDRAM, Synchronous Dynamic Random Access Memory), a double data rate synchronous dynamic random access memory (DDRSDRAM, Double Data Rate Synchronous Dynamic Random Access Memory), an enhanced synchronous dynamic random access memory (ESDRAM, Enhanced Synchronous Dynamic Random Access Memory), a syncLink dynamic random access memory (SLDRAM, SyncLink Dynamic Random Access Memory), and a direct rambus random access memory (DRRAM, Direct Rambus Random Access Memory). The redundancy check cache 1402 described in the examples of the present disclosure is intended to include, but is not limited to, these and any other suitable types of memories.

The redundancy check cache 1402 in the examples of the present disclosure is used for storing various types of data, so as to support the operation of the memory controller 106. Examples of these data include: any computer program for operation on the memory controller 106, for example, redundancy check data may be contained in the redundancy check cache 1402.

The method disclosed in the examples of the present disclosure may be applied to the processor 1401, or implemented by the processor 1401. The processor may be an integrated circuit chip having a signal processing capability. In an implementation process, the steps of the foregoing method may be completed by an integrated logic circuit of hardware in a processor or an instruction in a form of software. The processor may be a general-purpose processor, a digital signal processor (DSP, Digital Signal Processor), or other programmable logic devices, discrete gates or transistor logic devices, discrete hardware components, and the like. The processor may implement or execute the methods, steps and logical block diagrams disclosed in the examples of the present disclosure. The general-purpose processor may be a microprocessor or any conventional processor or the like. The steps of the method disclosed in the examples of the present disclosure may be directly embodied as a hardware decoding processor for execution, or implemented by combining hardware in a decoding processor with a software module. The software module may be located in a storage medium, the storage medium is located in the memory, and the processor reads information from the memory and completes the steps of the foregoing method in combination with the hardware thereof.

In one example, the memory controller 106 may be implemented by one or more application specific integrated circuits (ASICs, Application Specific Integrated Circuits), DSPs, programmable logic devices (PLDs, Programmable Logic Devices), complex programmable logic devices (CPLDs, Complex Programmable Logic Devices), field-programmable gate arrays (FPGAs, Field-Programmable Gate Arrays), general processors, controllers, micro-controller units (MCUs, Micro Controller Units), microprocessors (Microprocessors), or other electronic components, so as to execute the above method.

In the several examples provided by the present application, the disclosed devices and methods may be implemented in other manners. The device examples described above are merely examples, for example, the division of the units is only a logic function division, there may be other division manners in practical implementations, for example, a plurality of units or components may be combined or integrated to another system, or some features may be omitted or not executed. In addition, the displayed or discussed mutual coupling or direct coupling or communication connection between the components may be indirect coupling or communication connection of devices or units by means of some interfaces, and may be in electrical, mechanical or other forms.

The units described as separate components may be separated physically or not, components displayed as units may be physical units or not, namely, may be located in one place, and may also be distributed on a plurality of units; and a part of or all of the units may be selected to implement the purposes of the solutions in the present example according to actual demands.

In addition, various functional units in various examples of the present disclosure may be integrated in one processing unit, or the units are individually used as single units, or two or more units are integrated in one unit; and the integrated unit may be implemented in the form of hardware, and may also be implemented in the form of hardware plus a software functional unit.

All or some steps for implementing the foregoing method examples may be completed by a program instructing related hardware, the foregoing program may be stored in a computer-readable storage medium, and when executed, the program executes the steps including the foregoing method examples; and the foregoing storage medium includes various media capable of storing program codes, such as a mobile storage device, a read-only memory (ROM, Read-Only Memory), a random access memory (RAM, Random Access Memory), a magnetic disk, or an optical disk, etc.

Or, if the integrated unit in the present disclosure is implemented in the form of a software functional module and is sold or used as an independent product, it may be stored in a computer-readable storage medium. The technical solutions of the examples of the present disclosure substantially or portions contributing to the prior art may be implemented in the form of a software product, the computer software product is stored in a storage medium, and includes several instructions for enabling a computer device (which may be a personnel computer, a server, or a network device or the like) to execute all or some of the methods in various examples of the present disclosure. The foregoing storage medium includes a variety of media capable of storing program codes, such as a mobile storage device, an ROM, an RAM, a magnetic disk, or an optical disk, etc.

The present application further provides a memory system, including: one or more memories; the one or more memories include a memory array; and a memory controller coupled with the one or more memories and is configured to control the one or more memories, wherein, the memory controller includes: a processor, a redundancy check cache, a first communication interface coupled with a host, and a second communication interface coupled with the one or more memories, wherein, the first communication interface is configured to at least: receive a working mode switching command sent by the host;

the processor is configured to at least: in response to the working mode switching command, determine the state of each redundancy check data in the redundancy check cache contained in the memory controller; each redundancy check data is used for fault data recovery of a corresponding storage area in the memory array; and generate a write command carrying the redundancy check cache in the state of an updated state;

the second communication interface is configured to at least: send the write
command to the one or more memories; and
the one or more memories are configured to at least: in response to the write command, write the redundancy check data in the state of an updated state into a backup area of the memory array.

In some examples, the memory system is contained in one of: a solid state disk (SSD) and a memory card.

The first communication interface may be a front-end interface in the foregoing examples; and the second communication interface may be a back-end interface in the foregoing examples.

The memory system and the foregoing operating method of the memory controller may belong to the same inventive concept. The memory system contains the foregoing memory controller, therefore nouns appearing herein are all explained in detail in the foregoing operating method and the memory controller, which are also applicable herein, and thus details are not described herein again. The structure of the memory controller, which is most relevant to the technical solutions of the present application, is described herein. For the structure and description of the memory system as shown in FIG. 1 to FIG. 6, the memory system provided in the present application also contains the same and is also applicable. The memory system further includes a structure, which is not shown but is required for the normal work of the memory system, and in view of the length of the application file, no repeated description will be given in the present application one by one.

The present application further provides an electronic device, including:

a memory system; the memory system includes one or more memories including a memory array; and a memory controller coupled with the one or more memories and is configured to control the one or more memories; and a host coupled with the memory system, wherein, the host is coupled with a first communication interface of the memory controller, and is configured to: send a working mode switching command to the memory controller by means of the first communication interface;

the memory controller is coupled with the one or more memories by means of a second communication interface contained therein, and is configured to at least: receive the working mode switching command by means of the first communication interface; in response to the working mode switching command, determine the state of each redundancy check data in the redundancy check cache contained in the memory controller, and each redundancy check data being used for fault data recovery of a corresponding storage area in the memory array; and generate a write command carrying the redundancy check cache in the state of an updated state; and send the write command to the one or more memories by means of the second communication interface; and the one or more memories are configured to at least: in response to the write command, write the redundancy check data in the state of an updated state into a backup area of the memory array.

In some examples, the memory controller is further configured to: set, to be a second flag, flag information corresponding to redundancy check data generated by the one or more memories by executing a first operation, wherein the first operation includes: a write operation triggered by the host and/or a write operation triggered by the memory controller; and when the flag information is the second flag, the state of the corresponding redundancy check data is an updated state.

The first communication interface may be a front-end interface in the foregoing examples; and the second communication interface may be a back-end interface in the foregoing examples.

The electronic device and the foregoing operating method of the memory controller may belong to the same inventive concept. The electronic device contains the foregoing memory system, therefore nouns appearing herein are all explained in detail in the foregoing operating method and the memory controller, which are also applicable herein, and thus details are not described herein again. The structure most relevant to the technical solutions of the present application is described herein. For the structure and description of the electronic device as shown in FIG. 1, the electronic device provided in the present application also contains the same and is also applicable. The electronic device further includes a structure, which is not shown but is required for the normal work of the electronic device, and in view of the length of the application file, no repeated description will be given in the present application one by one.

In view of this, examples of the present application provide an operating method for a memory controller, a memory controller, a system, and an electronic device, so as to solve some problems.

The technical solutions of the present application are implemented as follows:

The examples of the present application provide an operating method for a memory controller, the memory controller is contained in a memory system; the memory system further includes a memory, and the memory comprises a memory array and is controlled by the memory controller; the operating method includes: in response to a working mode switching command, determining a state of redundancy check data in a redundancy check cache of the memory controller, and the redundancy check data being used for data recovery of a corresponding storage area in the memory array; and backing up the redundancy check data in the state of an updated state into a backup area of the memory array.

The examples of the present application further provide a memory controller, the memory controller is contained in a memory system; the memory system further includes a memory, and the memory comprises a memory array and is controlled by the memory controller; the memory controller includes a processor and a redundancy check cache, wherein, the processor is configured to: in response to a working mode switching command, determine a state of redundancy check data in the redundancy check cache of the memory controller; the redundancy check data is used for data recovery of a corresponding storage area in the memory array; and back up the redundancy check data in the state of an updated state into a backup area of the memory array.

The examples of the present application further provide a memory system, including: one or more memories; the one or more memories contain a memory array; and a memory controller coupled with the one or more memories and is configured to control the one or more memories, wherein, the memory controller includes: a first communication interface coupled with a host, a processor, a redundancy check cache, and a second communication interface coupled with the one or more memories, wherein, the first communication interface is configured to: receive a working mode switching command sent by the host;

the processor is configured to: in response to the working mode switching command, determine the state of each redundancy check data in the redundancy check cache contained in the memory controller; each redundancy check data is used for fault data recovery of a corresponding storage area in the memory array; and generate a write command carrying the redundancy check cache in the state of an updated state; and the second communication interface is configured to: send the write command to the one or more memories; and the write command causes the one or more memories to write the redundancy check data in the state of an updated state into a backup area of the memory array.

The present application further provides an electronic device, including: a memory system; the memory system includes one or more memories, and the one or more memories containing a memory array; and a memory controller coupled with the one or more memories and is configured to control the one or more memories; and a host coupled with the memory system, wherein, the host is coupled with a first communication interface of the memory controller, and is configured to: send a working mode switching command to the memory controller by means of the first communication interface;

the memory controller is coupled with the one or more memories via a second communication interface contained in the memory controller, and is configured to: receive the working mode switching command via the first communication interface; in response to the working mode switching command, determine the state of each redundancy check data in the redundancy check cache contained in the memory controller, and each redundancy check data being used for fault data recovery of a corresponding storage area in the memory array; and generate a write command carrying the redundancy check cache in the state of an updated state; and send the write command to the one or more memories via the second communication interface; and the one or more memories are configured to: in response to the write command, write the redundancy check data in the state of an updated state into a backup area of the memory array.

The examples of the present application provide an operating method for a memory controller, a memory controller, a system, and an electronic device. The operating method includes: in response to a working mode switching command, determining a state of redundancy check data in a redundancy check cache of the memory controller, and the redundancy check data being used for data recovery of a corresponding storage area in the memory array; and backing up the redundancy check data in the state of an updated state to a backup area of the memory array. By means of the backup mode of the redundancy check data provided by the examples of the present application, there is no need to back up all redundancy check data during backup, such that the write amount and the usage amount of the backup area are not increased, the backup area is saved, and the over provisioning can be increased, thereby improving the performance and durability of the product.

The above descriptions are merely preferred examples of the present application, and are not intended to limit the protection scope of the present application.

What is claimed is:

1. An operating method for a memory controller contained in a memory system, the memory system further includes a memory, and the memory includes a memory array and is controlled by the memory controller; the operating method comprising:
   in response to a working mode switching command, determining a state of redundancy check data in a redundancy check cache of the memory controller, the redundancy check data being used for data recovery of a corresponding storage area in the memory array;
   sending, via a second communication interface coupled with the memory, a write command to the memory, the write command including the redundancy check data in the state of an updated state; and
   backing up the redundancy check data in the state of the updated state into a backup area of the memory array.

2. The operating method of claim 1, wherein determining the state of the redundancy check data in the redundancy check cache of the memory controller-comprises:
   obtaining flag information corresponding to the redundancy check data; and
   determining the state of the redundancy check data based on the flag information.

3. The operating method of claim 2, wherein the flag information comprises a first flag or a second flag and wherein the determining of the state of the redundancy check data based on the flag information comprises:
   when the flag information comprises the first flag, determining that the state of the corresponding redundancy check data is a non-updated state; and
   when the flag information comprises the second flag, determining that the state of the corresponding redundancy check data is the updated state.

4. The operating method of claim 3, wherein the redundancy check data is first redundancy check data, wherein the backing up of the first redundancy check data in the state of the updated state into the backup area of the memory array comprises:
   gradually traversing the first redundancy check data and second redundancy check data in the redundancy check cache, and backing up the first redundancy check data for which the flag information is the second flag into the backup area of the memory array; and
   skipping the second redundancy check data for which the flag information is the first flag from being backed up, until the first and second redundancy check data is traversed.

5. The operating method of claim 2, wherein the flag information comprises a second flag and the operating method further comprises:
   setting, to be the second flag, the flag information corresponding to the redundancy check data in the redundancy check cache, the redundancy check data generated by executing a first operation, wherein the state of the redundancy check data corresponding to the second flag is the updated state.

6. The operating method of claim 5, wherein the flag information further comprises a first flag and the operating method further comprises:
   after the backing up of the redundancy check data generated by executing the first operation, setting, to be the first flag, the flag information corresponding to the redundancy check data generated by executing the first operation, wherein the state of the redundancy check data corresponding to the first flag is a non-updated state.

7. The operating method of claim 5, wherein the first operation comprises: a write operation triggered by a host that is coupled with the memory system, and/or a write operation triggered by the memory controller.

8. The operating method of claim 2, wherein the operating method further comprises:
   maintaining a redundancy check state table, the redundancy check state table including a mapping relationship between the redundancy check data in the redundancy check cache and the flag information; and
   obtaining the flag information corresponding to the redundancy check data includes:
   obtaining the flag information corresponding to the redundancy check data according to the redundancy check state table.

9. The operating method of claim 1, wherein the working mode switching command comprises one of: a stop start unit (SSU) mode switching command, an auto-standby mode switching command, or a write booster (WB) mode switching command.

10. A memory controller, wherein the memory controller is in a memory system, the memory system further comprises a memory, and the memory comprises a memory array and is controlled by the memory controller; the memory controller comprises a processor, a redundancy check cache, and a second communication interface coupled with the memory, wherein:
    the processor is configured to, in response to a working mode switching command, determine a state of redundancy check data in the redundancy check cache of the memory controller, the redundancy check data being used for data recovery of a storage area of a corresponding state in the memory array;
    the second communication interface is configured to send, to the memory, a write command carrying the redundancy check data in the state of an updated state; and
    the processor is configured to back up the redundancy check data in the state of the updated state into a backup area of the memory array.

11. The memory controller of claim 10, wherein the processor is further configured to at least:
    obtain flag information corresponding to the redundancy check data; and determine the state of the redundancy check data based on the flag information.

12. The memory controller of claim 11, wherein the flag information comprises a first flag or a second flag, the processor is further configured to at least:
when the flag information comprises the first flag, determine that the state of the corresponding redundancy check data is a non-updated state; and
when the flag information comprises the second flag, determine that the state of the corresponding redundancy check data is the updated state.

13. The memory controller of claim 12, wherein the redundancy check data is first redundancy check data, wherein the processor is further configured to at least:
gradually traverse the first redundancy check data and second redundancy check data in the redundancy check cache, and back up the first redundancy check data for which the flag information is the second flag into the backup area of the memory array; and
skip the second redundancy check data for which the flag information is the first flag from being backed up, until the first and second redundancy check data is traversed.

14. The memory controller of claim 11, wherein the flag information comprises a second flag and the processor is further configured to at least: set, to be the second flag, the flag information corresponding to redundancy check data generated by executing a first operation in the redundancy check cache, wherein the state of the redundancy check data corresponding to the second flag is the updated state.

15. The memory controller of claim 14, wherein the flag information further comprises a first flag and the processor is further configured to at least:
after the back up of the redundancy check data generated by executing the first operation, set, to be the first flag, the flag information corresponding to the redundancy check data generated by executing the first operation, wherein the state of the redundancy check data corresponding to the first flag is a non-updated state.

16. The memory controller of claim 11, wherein the processor is further configured to at least:
maintain a redundancy check state table, the redundancy check state table includes a mapping relationship between the redundancy check data in the redundancy check cache and the flag information; and
obtain the flag information corresponding to the redundancy check data according to the redundancy check state table.

17. The memory controller of claim 10, wherein the memory controller further comprises a first communication interface coupled with a host and configured to receive the working mode switching command sent by the host.

18. A memory system, comprising:
one or more memories including a memory array; and
a memory controller coupled with the one or more memories and configured to control the one or more memories, wherein the memory controller includes:
a first communication interface coupled with a host and configured to receive a working mode switching command sent by the host;
a redundancy check cache;
a processor configured to at least:
in response to the working mode switching command, determine a state of each redundancy check data in the redundancy check cache, each of the redundancy check data being used for fault data recovery of a corresponding storage area in the memory array; and
generate a write command carrying the redundancy check data in the state of an updated state; and
a second communication interface coupled with the one or more memories and configured to at least:
send the write command to the one or more memories;
wherein the one or more memories are configured to at least: in response to the write command, write the redundancy check data in the state of the updated state into a backup area of the memory array.

19. The memory system of claim 18, wherein the memory system is in at least one of: a solid state disk (SSD) and a memory card.

20. The memory system of claim 18, wherein the working mode switching command comprises one of: a stop start unit (SSU) mode switching command, an auto-standby mode switching command, or a write booster (WB) mode switching command.

* * * * *